March 6, 1934.    R. F. FRANKLIN    1,950,170
COMMUTATING ARRANGEMENT FOR DYNAMOTORS
Filed Dec. 30, 1931

Inventor:
Raymond F. Franklin,
by Charles V. Tullar
His Attorney.

Patented Mar. 6, 1934

1,950,170

UNITED STATES PATENT OFFICE 1,950,170

COMMUTATING ARRANGEMENT FOR DYNAMOTORS

Raymond F. Franklin, Scotia, N. Y., assignor to General Electric Company, a corporation of New York Application December 30, 1931, Serial No. 583,810

4 Claims. (Cl. 171—228)

My invention relates to a commutating arrangement for dynamotors.

In a dynamo-electric machine of this type two armature windings are employed, each connected to a separate commutator and revolving in a common field, for converting the current from one voltage to another, one of the armature windings being utilized as a motor winding, and the other winding being utilized as a generator winding. It has not been possible to use the ordinary type of commutating pole on these machines, with the winding arrangements used heretofore, because the commutating flux required to overcome the reactance voltage of the coils of the motor winding is of a polarity opposite to that required to overcome the reactance voltage of the coils of the generator winding. For this reason, the difficulties encountered in commutation have made it impracticable to construct dynamotors of large size.

The object of my invention is to provide a commutating arrangement for dynamotors, so that there will be no limitation in their size, due to commutation. I accomplish this by providing a dynamotor having one of the armature windings arranged in such manner that its reactance will be a minimum, so that commutation can be effected without a commutating flux, and an arrangement for producing a commutating flux for the other armature winding.

My invention will be more fully set forth in the following description, referring to the accompanying drawing, and the features of novelty which characterize my invention will be pointed out with particularity in the claims annexed to and forming a part of this specification.

Figure 1:
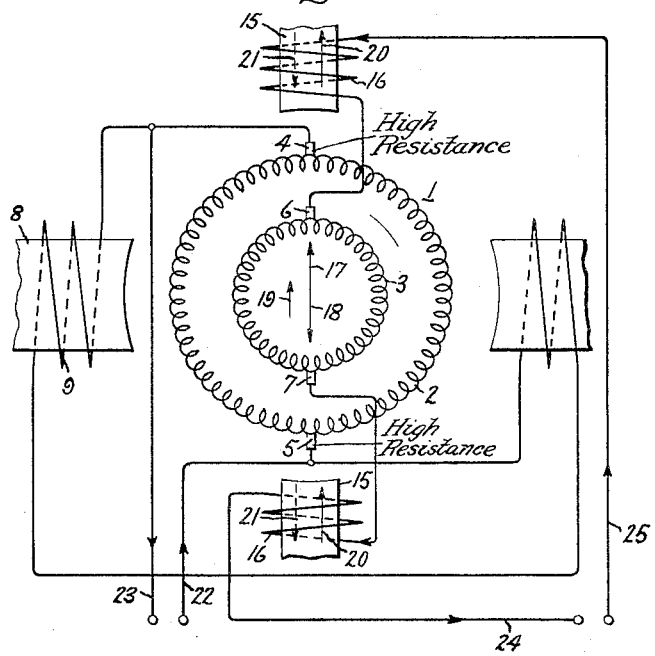
Figure 2:
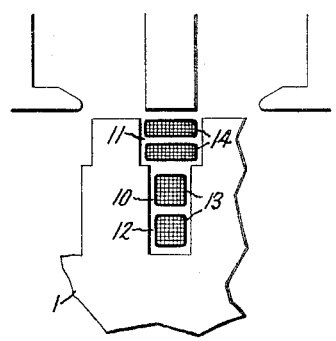

In the drawing, Fig. 1 is a diagrammatic illustration of a dynamotor embodying my invention; and Fig. 2 is a fragmentary end sectional view of the armature of the dynamotor shown in Fig. 1, illustrating the preferred arrangement of the windings in the armature slots.

In the drawing, I have shown my invention in connection with a dynamotor comprising an armature 1 having insulated motor and generator windings 2 and 3, which are connected to separated commutators. Motor brushes 4 and 5 and generator brushes 6 and 7 are provided for the commutators, although, for the purpose of simplifying the drawing, the brushes are diagrammatically shown in contact with the windings. The field structure comprises main field poles 8 provided with shunt field windings 9 connected across the motor winding 2.

In accordance with my invention, satisfactory commutation is obtained in this machine by providing armature slots 10 having a wide top portion 11 and a narrow bottom portion 12, arranging the coil sides or conductors 13 of the generator windings 3 in the bottom portion of the slots, and arranging the coil sides 14 of the motor winding 2, which are wider and not as high as the generator coil sides 13, in the top portion of the slots, as shown in Fig. 2. Commutating poles 15 having windings 16 connected in series with the generator winding 3 are provided for producing a commutating flux in the commutating zone of the generator winding.

In this winding arrangement the reactance of the coils of the motor winding is reduced to a value considerably less than the reactance of the coils of the generator winding, because the reluctance of the cross slot flux path is a maximum at the wide portion 11 of the slots. Due to the low reactance of the coils of the motor winding, their reactance voltages are small, so that the coils can be effectively commutated without the use of a commutating flux. It is desirable to provide sufficient resistance in the circuits of the motor coils to facilitate commutation. This may be accomplished by employing brushes of high resistivity, so that a high contact resistance between the brush faces and the commutator is obtained, or in any other suitable manner, for assisting in the reversal of the motor current. In this manner the motor winding can be effectively commutated by resistance, and the generator winding is effectively commutated by the flux produced by commutating poles 15, which overcomes the reactance voltage of the coils of generator winding.

It is to be noted that in this winding arrangement the commutating flux is of such polarity that it aids the commutation of the bottom generator winding, and opposes the commutation of the top motor winding. The effects of the flux opposing the commutation of the motor winding do not seriously affect commutation, because the amount of flux produced by the commutating windings 16 is reduced to a value just sufficient to obtain satisfactory commutation of the generator winding, and sufficient resistance is provided in the circuits of the short circuited motor coils during commutation, so that the resistance voltage drop will effectively commutate the motor coils.

With the motor and generator brushes arranged on the same mechanical neutral axis, the armature reactions of the motor and generator windings, indicated by the arrows 17 and 18 respectively, are opposite and substantially neutralize each other, except for a small cross magnetizing component of armature reaction indicated by the arrow 19. This is due to the slight increase in the motor current from the predetermined ratio of the motor and generator currents to supply the losses in the dynamotor. It is to be noted that the resultant cross magnetization component 19 of armature reaction, with clockwise rotation of the armature as indicated by the arrow, is in the same direction as the commutating flux produced by the commutating poles 15, as indicated by the arrows 20. The cross magnetizing component 19 of armature reaction therefore aids the commutating flux, so that less magnetization of the commutating poles is required.

It may sometimes be desirable to arrange the motor winding in the bottom narrow portion of the slots, and the generator winding in the top wide portion 11 of the slots. In this arrangement the direction of the commutating flux, indicated by the dotted arrows 21, is in the opposite direction from the cross magnetizing component 19 of armature reaction. With the motor winding arranged in the narrow portion of the slots, it is therefore necessary to provide sufficient commutating flux to neutralize the cross magnetizing component 19 of armature reaction, and the reactance voltage of the bottom motor winding.

Arranging the windings in slots varying in width from the top to the bottom also reduces winding heating, the heating being produced by eddy currents, which are induced in the windings by the magnetic flux in the slot. This flux is set up by the current in the armature conductors, and its density increases from the bottom of the bottom conductors towards the mouth of the slot. By providing slots having a wide top portion, the reluctance of the cross slot flux path at the mouth of the slots is increased, so that the flux density at the mouth of the slot is decreased, thereby reducing the heating of the winding produced by eddy currents. Such heating of the winding is further reduced by providing the armature conductors 14 having less depth and greater width than the bottom conductors 13, as the heating varies as the fourth power of the height of the armature conductors.

In the normal operation of a dynamotor embodying my commutating arrangement, current is supplied to the motor winding through the leads 22 and 23, which causes motor action, thereby generating an electromotive force in the generator winding, which is connected to a load by the leads 24 and 25. The generator current flowing in the commutating windings 16 produces a commutating flux of proper polarity in the commutating zone of the bottom generator winding. The top motor winding is commutated by the resistance in the circuits of the coils short circuited by the motor brushes. It will thus be seen that I have provided a commutating arrangement for dynamotors which will not limit their size, because the motor winding is effectively commutated by resistance without a commutating flux, and the generator winding is effectively commutated by the flux produced by the commutating poles.

Modifications of the embodiment of my invention which I have described will occur to those skilled in the art, so that I desire my invention not to be limited to the particular arrangement set forth, and I intend in the claims to cover all modifications thereof which do not depart from the spirit and scope of my invention.

What I claim as new and desire to secure by Letters Patent of the United States, is:

1. A dynamotor including motor and generator armature windings and separate commutators for said windings, one of said windings having a substantially smaller reactance than the other, means for producing a commutating flux for the other of said windings, and means for commutating said one winding in the zone of said commutating flux.

2. A dynamotor including an armature having slots varying in width from the bottom to the top thereof, motor and generator windings arranged in said slots and having separate commutators, one of said windings being arranged in the widest portion of said slots, means for producing a commutating flux for the other of said windings, and means for commutating said one winding in the zone of said commutating flux.

3. A dynamotor including an armature having slots wider at the top than at the bottom, motor and generator armature windings arranged in said slots and having separate commutators, main field poles, one of said windings being arranged in the top portion of said slots, means including commutating poles arranged between said main field poles for producing a commutating flux for the other of said windings, and means for commutating said one winding in the zone of said commutating flux.

4. A dynamotor including an armature provided with slots having an upper wide portion and a lower narrow portion, motor and generator armature windings having separate commutators, one of said windings being arranged in the narrow lower portion of said slots and the other of said windings being arranged in the wide upper portion of said slots, means including commutating poles for producing a commutating flux for said lower winding, and means including a resistance for commutating said upper winding in the zone of said commutating flux.

RAYMOND F. FRANKLIN.